US009408480B2

(12) United States Patent
O'Toole

(10) Patent No.: US 9,408,480 B2
(45) Date of Patent: Aug. 9, 2016

(54) EYEWEAR DISPLAY ASSEMBLIES AND RELATED METHODS

(71) Applicant: Marchon Eyewear, Inc., Melville, NY (US)

(72) Inventor: Thomas O'Toole, Deer Park, NY (US)

(73) Assignee: Marchon Eyewear, Inc., Melville, NY (US)

( * ) Notice: Subject to any disclaimer, the term of this patent is extended or adjusted under 35 U.S.C. 154(b) by 0 days.

(21) Appl. No.: 14/539,805

(22) Filed: Nov. 12, 2014

(65) Prior Publication Data

US 2016/0128494 A1    May 12, 2016

(51) Int. Cl.
*A47F 7/02* (2006.01)
*A47F 5/16* (2006.01)
*F16B 1/00* (2006.01)
*G09F 3/20* (2006.01)

(52) U.S. Cl.
CPC . *A47F 7/021* (2013.01); *A47F 5/16* (2013.01); *F16B 1/00* (2013.01); *G09F 3/204* (2013.01); *F16B 2001/0035* (2013.01)

(58) Field of Classification Search
CPC ......... A47F 5/16; A47F 7/021; A47F 7/0243; A47F 2005/165; F16B 1/00; F16B 2001/0035; G09F 3/18; G09F 3/185; G09F 3/20; G09F 3/204; G09F 5/00; G09F 5/02; G09F 5/04; G09F 15/00; G09F 15/0012; G09F 2005/046; G09F 2005/047

USPC .................. 211/40, 41.12, 85.1; 40/600, 657
See application file for complete search history.

(56) References Cited

U.S. PATENT DOCUMENTS

| | | | | | |
|---|---|---|---|---|---|
| 2,747,760 | A | * | 5/1956 | Jacobson | A47F 7/021 206/6 |
| 2,816,666 | A | * | 12/1957 | Nadel | A47F 5/02 206/461 |
| 3,333,709 | A | * | 8/1967 | Leblanc | A47F 7/021 211/144 |
| 3,351,208 | A | * | 11/1967 | Siegel | A47F 7/021 211/85.1 |
| 3,836,007 | A | * | 9/1974 | Rosenwein | A47F 7/021 116/75 |

(Continued)

*Primary Examiner* — Joshua Rodden
(74) *Attorney, Agent, or Firm* — Brient Globerman, LLC; Kyle M. Globerman

(57) ABSTRACT

An eyewear display assembly, according to various embodiments, has a base portion (e.g., a rectangular base portion), a marketing materials sheet, and an eyewear support portion (e.g., a rectangular eyewear support portion. In various embodiments, the eyewear support portion defines one or more eyewear support cutouts for providing lateral support to eyewear placed within the one or more eyewear support cutouts. The eyewear display assembly further has a suitable affixing mechanism, such as one or more magnets, for mounting the base portion adjacent the eyewear support portion while holding marketing material sheet between them. The base portion may be configured to support one or more pairs of eyewear as the one or more pairs of eyewear are disposed at least partially within the one or more eyewear support cutouts.

21 Claims, 4 Drawing Sheets

(56) References Cited

U.S. PATENT DOCUMENTS

| | | | | |
|---|---|---|---|---|
| 3,858,726 A * | 1/1975 | Rosenwein | A47F 7/021 | 206/5 |
| 3,891,092 A * | 6/1975 | Surrette | A47F 5/04 | 211/163 |
| 4,157,760 A * | 6/1979 | Wilson | A47F 7/021 | 211/163 |
| 5,502,907 A * | 4/1996 | Wang | A47G 1/14 | 248/455 |
| 5,609,258 A * | 3/1997 | Spector | G11B 23/40 | 206/308.1 |
| 6,256,914 B1 * | 7/2001 | Yeh | A45C 1/12 | 40/711 |
| 6,880,710 B1 * | 4/2005 | Oliveras | A47F 7/021 | 206/5 |
| 7,188,738 B2 * | 3/2007 | Stafford | G09F 7/08 | 211/10 |
| 2005/0055859 A1 * | 3/2005 | Grablick | G09F 3/10 | 40/600 |
| 2005/0236281 A1 * | 10/2005 | Chao | A47F 7/021 | 206/6 |
| 2006/0081548 A1 * | 4/2006 | Babbino | A47F 5/02 | 211/85.1 |
| 2010/0199532 A1 * | 8/2010 | Blue | G09F 7/18 | 40/491 |

* cited by examiner

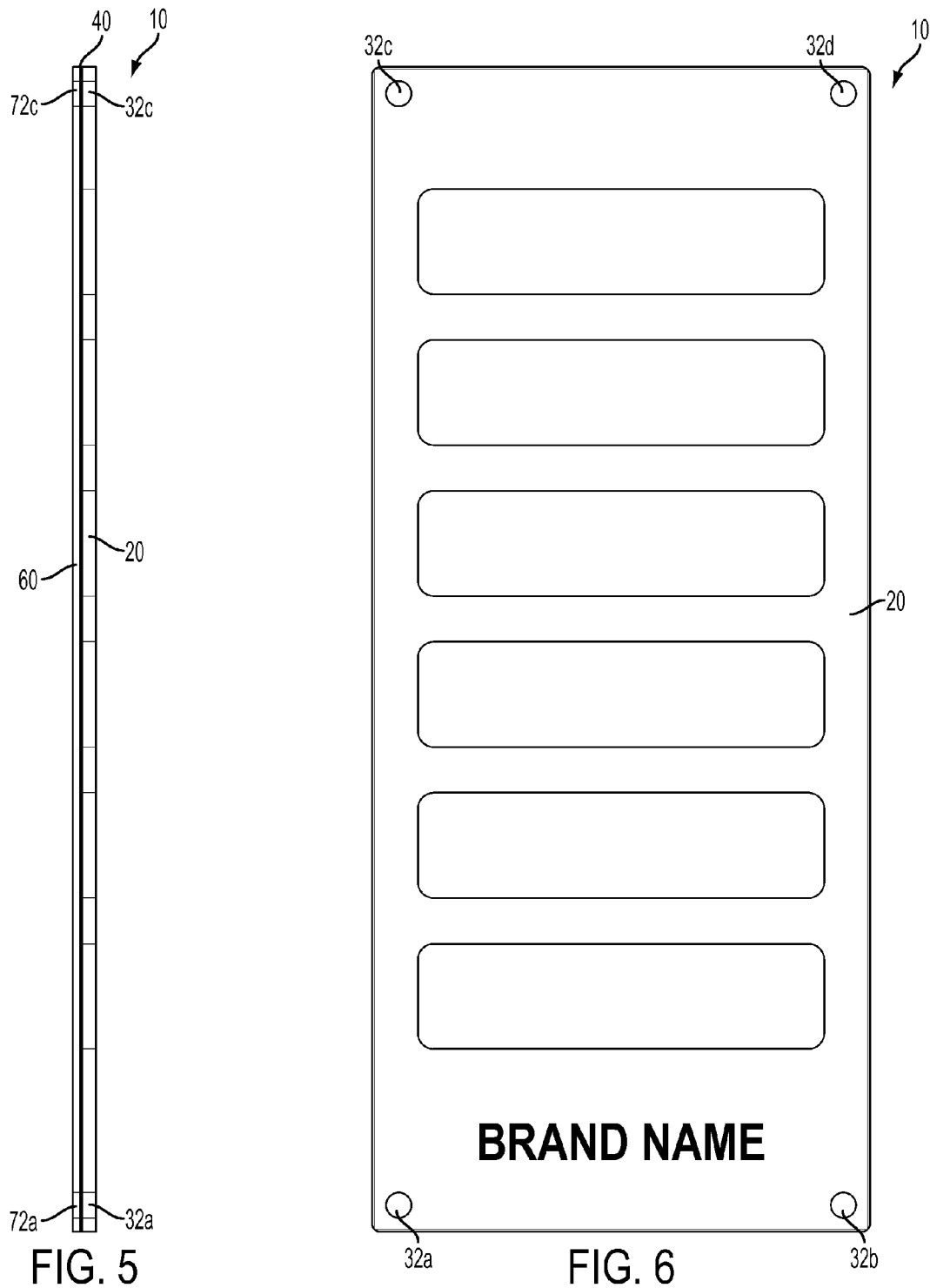

EYEWEAR DISPLAY ASSEMBLIES AND RELATED METHODS

BACKGROUND

Eyewear merchants, manufacturers, and others may desire to display their eyewear in a manner that draws in customers and enables the customers to access and try on the eyewear easily. Typically, eyewear in stores is displayed on a rack, shelf, or other flat surface. However, eyewear displayed in such locations may move or slide around as customers view or try on the eyewear. Accordingly, there is a need for improved displays and display assemblies that address these considerations.

SUMMARY

An eyewear display assembly, in various embodiments, comprises: (1) a base portion comprising at least one magnet and defining a substantially flat top surface; and (2) an eyewear support portion having a first end, a second end, a first side, and a second side and comprising at least one second magnet. In particular embodiments, the eyewear support portion defines: (1) a substantially flat bottom surface; (2) a top surface; and (3) at least one eyewear support cutout on the eyewear support portion top surface. In various embodiments: (1) the at least one first magnet and the at least one second magnet are configured to cooperate to maintain the base portion adjacent the eyewear support portion; (2) the base portion is configured to support a pair of eyewear; and (3) the eyewear support portion is configured to maintain the pair of eyewear at least partially within the at least one eyewear support cutout while the base portion is supporting the pair of eyewear.

An eyewear display assembly, according to a particular embodiment, comprises a substantially rectangular base portion having a first base end and a second base end. In various embodiments, the base portion defines: (1) a base top surface; (2) a first base magnet cutout adjacent the first base end; and (3) a second base magnet cutout adjacent the second base end. In particular embodiments, the eyewear display assembly further comprises a substantially rectangular eyewear support portion having a first support end and a second support end. In some embodiments, the eyewear support portion defines: (1) a support bottom surface; (2) a support top surface; a (3) first support magnet cutout adjacent the first support end; (4) a second support magnet cutout adjacent the second support end; (5) a first substantially rectangular eyewear support cutout adjacent the support top surface; and (6) a second substantially rectangular eyewear support cutout adjacent the support top surface and substantially parallel to the first eyewear support cutout. In various embodiments, the eyewear display assembly further comprises: (1) a first magnet disposed at least partially within the first base magnet cutout; (2) a second magnet dispose at least partially within the second base magnet cutout; (3) a third magnet disposed at least partially within the first support magnet cutout; and (4) a fourth magnet disposed at least partially within the second support magnet cutout. In particular embodiments: (1) the first magnet is configured to cooperate with the third magnet to maintain the first base end adjacent the first support end; (2) the second magnet is configured to cooperate with the fourth magnet to maintain the second base end adjacent the second support end; (3) the base portion is configured to support at least one pair of eyewear; and (4) the eyewear support portion is configured to maintain both: (1) a first pair of eyewear at least partially within the first eyewear support cutout while the base portion is supporting the first pair of eyewear; and (2) a second pair of eyewear at least partially within the second eyewear support cutout while the base portion is supporting the first pair of eyewear.

A method of displaying eyewear, according to various embodiments, comprises providing an eyewear display assembly comprising: (1) a substantially rectangular base portion having a first base end and a second base end, defining a base top surface, and comprising at least one base magnet; (2) a substantially rectangular, substantially flat marketing material sheet; and (3) a substantially rectangular eyewear support portion having a first support end and a second support end. In various embodiments, the eyewear support portion defines: (1) a support bottom surface, (2) a support top surface, and (3) at least one eyewear support cutout adjacent the support top surface. In particular embodiments, the eyewear support portion comprises at least one support magnet. In particular embodiments, the method further comprises: (1) providing a pair of eyewear; (2) facilitating placement of the base portion on a support surface with the base top surface facing substantially upwardly; (3) facilitating placement of the marketing material sheet on top of the base portion such that the marketing material sheet is substantially aligned with the base top surface; (4) facilitating placement of the eyewear support portion on top of the marketing material sheet and the base portion such that the support bottom surface is facing substantially downwardly, the support bottom face and the base top surface are substantially co-facing, and the at least one base magnet and the at least one support magnet are cooperating to maintain the base portion adjacent the eyewear support portion with the marketing material sheet at least partially between the base portion and the eyewear support portion; and (5) facilitating placement of the pair of eyewear at least partially within the at least one eyewear support cutout.

BRIEF DESCRIPTION OF THE DRAWINGS

Various embodiments of eyewear display assemblies are described below. In the course of this description, reference will be made to the accompanying drawings, which are not necessarily drawn to scale, and wherein:

FIG. 4 is an end view of the eyewear display assembly of FIG. 1;

FIG. 5 is a side view of the eyewear display assembly of FIG. 1; and

FIG. 6 is a top plan view of the eyewear display assembly of FIG. 1.

DETAILED DESCRIPTION OF VARIOUS EMBODIMENTS

Various embodiments will now be described more fully herein with reference to the accompanying drawings, in which various relevant embodiments are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Eyewear Display Assembly

Figure 1:
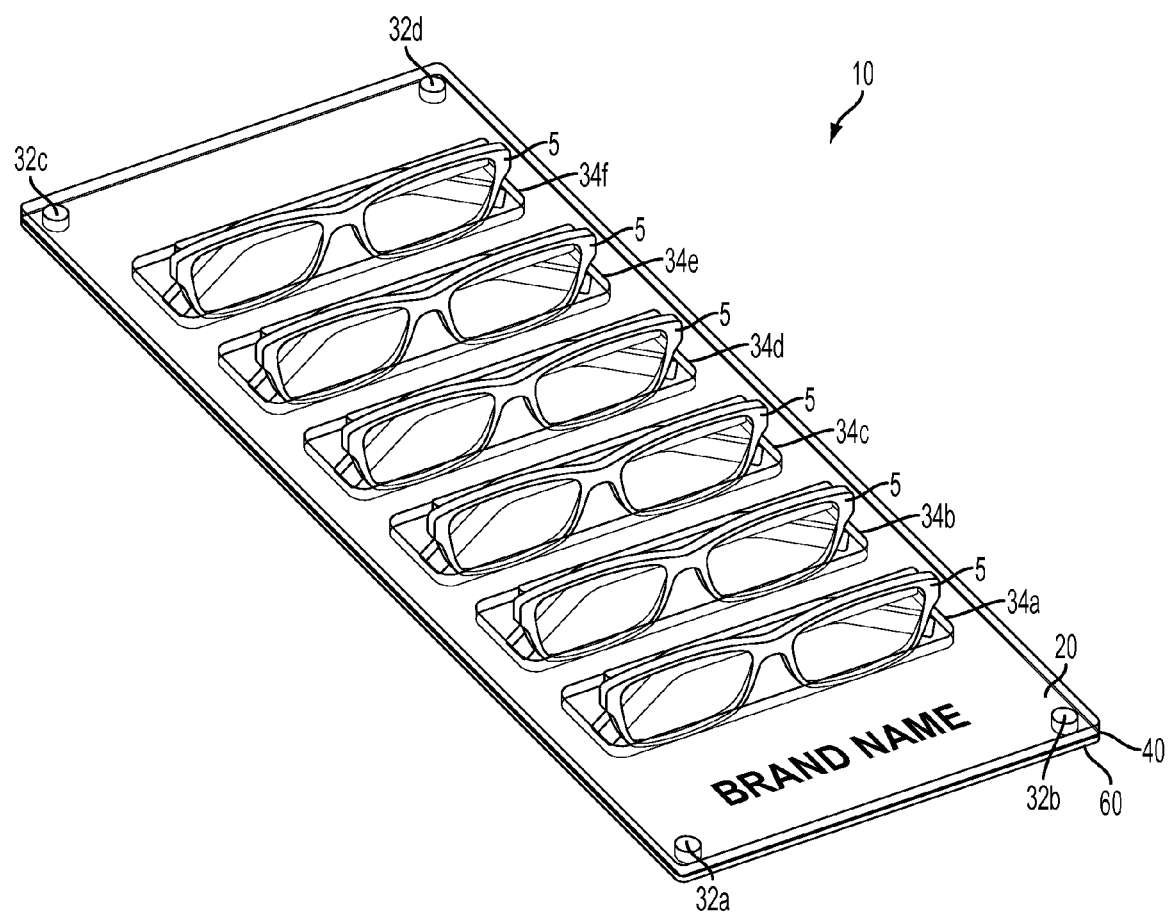
FIG. 1 is a top perspective view of an eyewear display assembly displaying eyewear in accordance with a particular embodiment.
Figure 2:
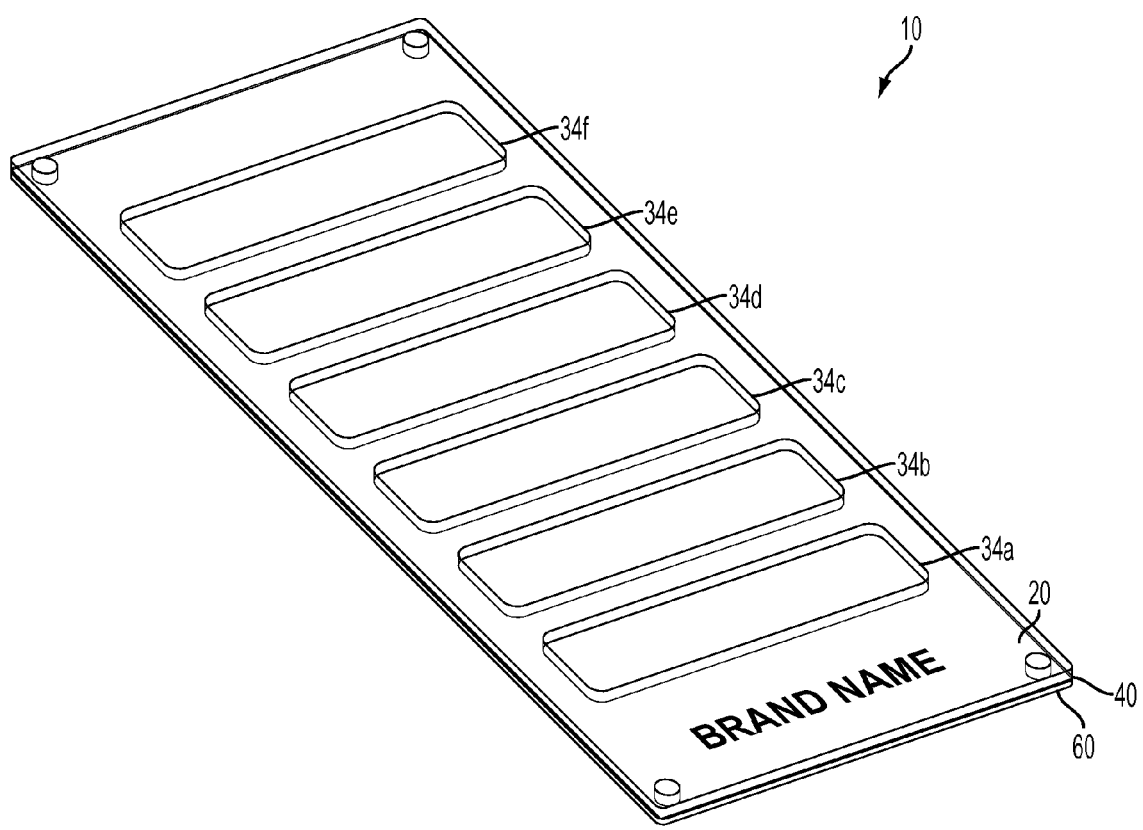
FIG. 2 is a top perspective view of the eyewear display assembly of FIG. 1 without the eyewear displayed.

An eyewear display assembly 10 according to a particular embodiment is shown in FIG. 1 supporting a plurality of eyewear 5. FIG. 2 depicts the eyewear display assembly 10 without any eyewear being supported. In the embodiment shown in these figures, the eyewear display assembly 10 comprises: (1) a substantially rectangular (e.g., rectangular) eyewear support portion 20; (2) a substantially rectangular (e.g., rectangular) marketing material portion 40 (e.g., a marketing material sheet); and (3) a substantially rectangular (e.g., rectangular) base portion 60. These components are discussed in greater detail below.

Eyewear Support Portion

Figure 3:
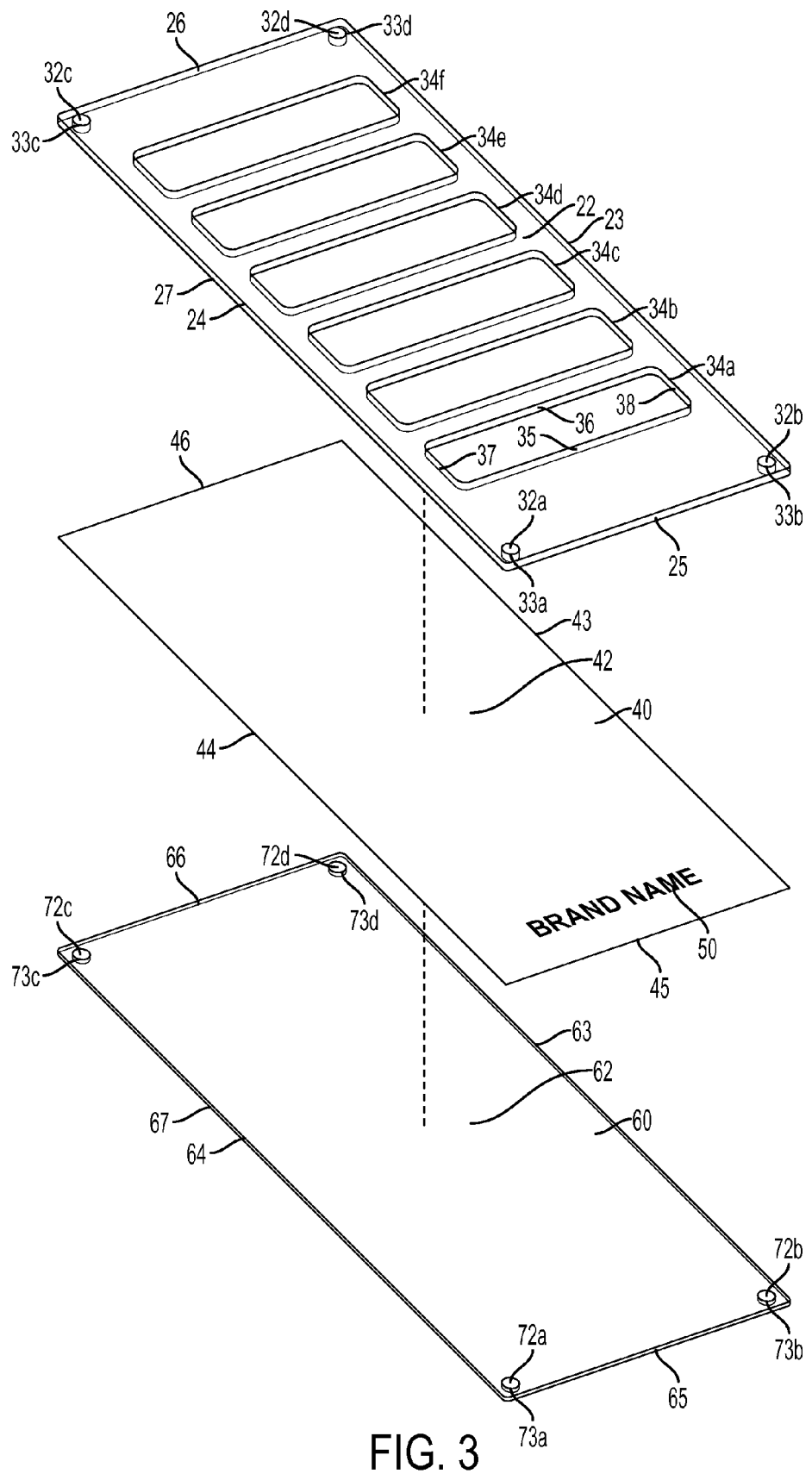
FIG. 3 is a perspective exploded view of the eyewear display assembly of FIG. 1.

As may be understood from FIG. 3, the eyewear support portion 20 is substantially rectangular (e.g., rectangular) and extends between a front end face 25 and a rear end face 26. In the embodiment shown in this figure, the eyewear support portion 20 is substantially planar (e.g., planar) and defines a top surface 22, bottom surface 27, right side face 23, and left side face 24. In this embodiment, the right side face 23 and left side face 24 are substantially parallel (e.g., parallel) to one another and substantially perpendicular (e.g., perpendicular) to the substantially parallel (e.g., parallel) front end face 25 and rear end face 26. In various embodiments, the front side face 25 and left side face 24, the left side face 24 and rear side face 26, the rear side face 26 and right side face 23, and the right side face 23 and front side face 25 each respectively meet at a substantially square (e.g., square) corner. In other embodiments, they meet at corner that is at least partially rounded (e.g., rounded). As may be understood from FIG. 3, the top surface 22, right side face 23, left side face 24, front side face 25, rear side face 26, and bottom surface 27 form a substantially rectangular (e.g., rectangular) prism that comprises the eyewear support portion 20.

In other embodiments, the eyewear support portion 20 may have any other suitable shape. For example, in particular embodiments, the eyewear support portion 20 may be substantially circular (e.g., circular), substantially ovular (e.g., ovular), substantially square (e.g., square), substantially triangular (e.g., triangular), substantially pentagonal (e.g., pentagonal), or have any other suitable shape.

In particular embodiments, the top surface 22, right side face 23, left side face 24, front side face 25, rear side face 26, and bottom surface 27 are substantially smooth (e.g., smooth). In other embodiments, the top surface 22, right side face 23, left side face 24, front side face 25, rear side face 26, and bottom surface 27 are at least partially textured (e.g., textured). In still other embodiments, each particular surface and face of the eyewear support portion 20 may have any other suitable texture and/or smoothness.

In the embodiment shown in FIG. 3, the eyewear support portion 20 defines a plurality of substantially rectangular (e.g., rectangular) eyewear support cutouts 34a-f. In a particular embodiment, the eyewear support portion 20 defines six eyewear support cutouts 34a-f. In still other embodiments, the eyewear support portion 20 may define any suitable number of eyewear support cutouts (e.g., one, two, three, four, five, seven, ten, etc.). In various embodiments, each particular eyewear support cutout 34 is substantially rectangular (e.g., rectangular) and extends from the eyewear support cutout's top surface 23 at least partially through the eyewear support portion 20 to its bottom surface 27. In the embodiment shown in FIG. 3, each particular eyewear support cutout 34 extends from the eyewear support cutout's top surface 23 through the eyewear support portion 20 to its bottom surface 27.

In other embodiments, the eyewear support portion 20 may define any other suitably shaped eyewear support cutout 34. For example, the eyewear support cutout may be substantially round (e.g., round), substantially ovular (e.g., ovular), substantially trapezoidal (e.g., trapezoidal), or any other shape suitable for receiving at least a portion of a pair of eyewear. In various embodiments, the eyewear support portion 20 may define a plurality of support cutouts, each sized and dimensioned for receiving at least a particular portion of a pair of eyewear. For example, in a particular embodiment, the eyewear support portion 20 may define a first cutout for supporting a first temple portion of a pair of eyewear, a second cutout for supporting a second temple portion of the pair of eyewear, and a third cutout for supporting a frame of the pair of eyewear.

Turning again to FIG. 3, each eyewear support cutout 34a-f, in the embodiment shown in this figure, defines a front interior face 35, a rear interior face 36, a left interior face 37, and a right interior face 38. Each eyewear support cutout 34 is substantially parallel (e.g., parallel) to the eyewear support cutout's top and bottom surfaces 23, 27. The left interior face 37 is substantially parallel (e.g., parallel) to the right interior face 38, and the front interior face 35 is substantially parallel (e.g., parallel) to the rear interior face 36. The front interior face 35 and rear interior face 36 are substantially perpendicular (e.g., perpendicular) to the left interior face 37 and the right interior face 38. The front, rear, left and right interior faces 35, 36, 37, 38 meet at a corner that is at least partially rounded (e.g., rounded). In other embodiments, the front, rear, left and right interior faces 35, 36, 37, 38 meet at a corner that is substantially square (e.g., square).

In particular embodiments, a central axis of the eyewear support cutouts 34a-f are substantially parallel to the front and rear end faces 25, 26. In other embodiments, the eyewear support cutouts 34a-f and the front end face 25 form an angle of between about zero degrees and about 45 degrees between the eyewear support cutouts 34a-f and the front end face 25. In such embodiments, the eyewear support cutouts 34a-f may be substantially parallel (e.g., parallel) to one another.

In the embodiment shown in FIG. 3, the eyewear support portion 20 defines a plurality of magnet recesses 33a-d adjacent the eyewear support portion's bottom surface 27. In the present embodiment, each magnet recess 33 is substantially circular (e.g., circular) and defined adjacent a corner of the eyewear support portion 20. For example, the first magnet recess 33a is defined adjacent an intersection point of the front side face 25 and left side face 24. The eyewear support portion 20 further comprises a plurality of first magnets 32a-d each of which is disposed at least partially within a corresponding magnet recess 33a-d. In the embodiment shown in this figure, each first magnet 32 is substantially cylindrical (e.g., cylindrical) and has a radius that at least partially corresponds to a radius of the corresponding magnet recesses 33a-d.

In other embodiments, the eyewear support portion 20 defines any other suitable number of suitably shaped magnet recesses 33. For example, the eyewear support portion 20 may define one, two, three, five, six, seven, eight, nine, ten, or any other suitable number of magnet recesses 33. The eyewear support portion 20 in some embodiments, comprises at least one substantially rectangular (e.g., rectangular) magnet recess 33, at least one substantially triangular magnet recess 33 or any other suitable combination or number of magnet recesses 32 having any suitable combination of shapes. In particular embodiments, the eyewear support portion 20 comprises at least one magnet 32 disposed at least partially within each magnet recess 33. In such embodiments, each particular magnet 32 is sized and shaped to at least generally correspond to a size and shape of each corresponding magnet recess 33. In various embodiments, the magnets 32 comprise any suitable magnet such as, for example, a neodymium iron born magnet, a samarium cobalt magnet, an alnico magnet, a ferrite magnet, etc.

In various embodiments, the eyewear support portion 20 comprises any suitable material such as, for example, any suitable plastic. The eyewear support portion 20 may be produced using any suitable manufacturing or other technique such as, for example, injection molding, blow molding, extrusion molding, 3-D printing, etc. In particular embodiments, the eyewear support portion 20 is substantially rigid (e.g., rigid). In various embodiments, at least a portion of the eyewear support portion 20 is at least partially translucent (e.g., translucent). In other embodiments, the eyewear support portion 20 is substantially opaque (e.g., opaque). In various embodiments, at least a portion of the eyewear support portion 20 is sufficiently transparent to allow a person to view one or more images, logos, or other pieces of text through the eyewear support portion 20.

Marketing Materials Portion

As may be understood from FIG. 3, in the embodiment shown, the marketing material portion 40, is substantially rectangular (e.g., rectangular) and substantially planar (e.g., planar). The marketing material portion 40 extends between a front edge 45 and rear edge 46 and has a right side 43 and left side 44. The front edge 45 is substantially parallel (e.g., parallel) to the rear edge 46, and the right side 43 is substantially parallel (e.g., parallel) to the left side 44. The front edge 45 and rear edge 46 are both substantially perpendicular to the right side 43 and the left side 44. In various embodiments the marketing material portion further defines a top face 42 and bottom face (not shown). The marketing material portion 40, in various embodiments, is sized and dimensioned to substantially correspond to (e.g., correspond to) a size of the eyewear support portion 20. For example, in the present embodiment, the eyewear support portion's front face 25 has substantially the same (e.g., the same) width as the marketing material portion's front edge 45, the eyewear support portion's rear face 26 has substantially the same (e.g., the same) width as the marketing material portion's rear edge 46, the eyewear support portion's right side face 23 has substantially the same (e.g., the same) length as the marketing material portion's right side edge 43, and the eyewear support portion's left side face 24 has substantially the same (e.g., the same) length as the marketing material portion's left side 44. In still other embodiments, the marketing material portion 40 may have any other suitable size and/or dimensions. In particular embodiments, the marketing material portion 40 may be at least partially smaller than the eyewear support portion 20, the base portion 60 or both. In various embodiments, the marketing material portion 40 comprises any suitable, substantially-thing marketing material portion 40.

In some embodiments, the marketing material portion 40 is thin (e.g., paper-thin). In particular embodiments, the marketing material portion 40 is between about 0.0032 inches and about 0.0175 inches thick. In various embodiments, the marketing material portion 40 is about 0.0036 inches thick. In other embodiments, the marketing material portion 40 may have any other suitable thickness (e.g., about 0.0038 inches, about 0.0058 inches, about 0.0062 inches, etc.). In particular embodiments, the marketing material portion 40 is sufficiently thin such that a first magnet placed adjacent the marketing material portion's top surface 42 and a second magnet placed adjacent the marketing material portion's bottom surface (not shown) would be sufficiently close in distance that an attractive force between the first and second magnet would be sufficient to maintain an attraction between the first and second magnet with the marketing material portion 40 between them.

In the embodiment shown in FIG. 3, the marketing material portion 40 comprises a sheet of paper. In various embodiments, the marketing material portion 40 comprises any suitable type of paper having any suitable paper weight (e.g., copy paper, cardstock, etc.), color, finish (e.g., glossy, matte, laminate, etc.), transparency, etc. In other embodiments, the marketing material portion 40 may comprise any other suitable material such as, for example, any suitable plastic (e.g., polyethylene terephthalate, polyvinyl chloride, polypropylene, etc.), any suitable cardboard or paperboard, or any other suitable material.

In particular embodiments, the marketing material portion 40 comprises one or more brand identifiers 50, which may for example include one or more brand names or other product information. In particular embodiments, the brand identifier 50 may be printed on the marketing material portion 40 in any suitable manner (e.g., directly on a paper marketing material portion 40). In other embodiments, the brand identifier may be affixed to the marketing material portion in any suitable manner (e.g., via a suitable adhesive such as resin or glue). In various embodiments, the brand identifier 50 includes any suitable brand name, product name, logo, or other information related to the eyewear or store in which the eyewear display assembly 10 is displayed. In other embodiments, the marketing material portion 40 may include any other suitable information printed on or affixed to the marketing material portion 40 such as, for example, sale information (e.g., relating to a price reduction of eyewear displayed on the eyewear display assembly), pricing information, etc.

Base Portion

As may be understood from FIG. 3, the base portion 60 is substantially rectangular (e.g., rectangular) and extends between a base front end face 65 and a base rear end face 66. In the embodiment shown in this figure, the base portion 60 is substantially planar (e.g., planar) and defines a base top surface 62, a base bottom surface 67, a base right side face 63, and a base left side face 64. In this embodiment, the base right side face 63 and base left side face 64 are substantially parallel (e.g., parallel) to one another and substantially perpendicular (e.g., perpendicular) to the substantially parallel (e.g., parallel) base front end face 65 and base rear end face 66. In various embodiments, the base front side face 65 and base left side face 64, the base left side face 64 and base rear side face 66, the base rear side face 66 and base right side face 63, and the base right side face 63 and base front side face 65 each respectively meet at a substantially square (e.g., square) corner. In other embodiments, they meet at a corner that is at least partially rounded (e.g., rounded). As may be understood from FIG. 3, the base top surface 62, base right side face 63, base left side face 64, base front side face 65, base rear side face 66, and base bottom surface 67 form a substantially rectangular (e.g., rectangular) prism that comprises the base portion 60.

In particular embodiments, the base portion 60 is sized and dimensioned to at least generally correspond to a size of the eyewear support portion 20. For example, in the present embodiment, the eyewear support portion's front face 25 has substantially the same (e.g., the same) width as the base front face 65, the eyewear support portion's rear face 26 has substantially the same (e.g., the same) width as the base rear face 66, the eyewear support portion's right side face 23 has substantially the same (e.g., the same) length as the base right side face 63, and the eyewear support portion's left side face 24 has substantially the same (e.g., the same) length as the base left side face 64.

In other embodiments, the base portion 60 may comprise any suitable shape. For example, in particular embodiments, the base portion 60 is substantially circular (e.g., circular), substantially square (e.g., square), substantially cylindrical (e.g., cylindrical), etc. In various embodiments, the base portion 60 is substantially the same shape as the eyewear support portion 20. In other embodiments, the base portion 60 has a shape other than the shape of the eyewear support portion 20. In still other embodiments, the base portion 60 has a shape that is substantially the same as the shape of the eyewear support portion 20 but has one or more dimensions that are greater than a corresponding dimension of the similarly shaped eyewear support portion 20 (e.g., the base portion 60 may be substantially rectangular and have a length that is greater than the substantially rectangular eyewear support portion 20).

In particular embodiments, the base top surface 62, base right side face 63, base left side face 64, base front side face 65, base rear side face 66, and base bottom surface 67 are substantially smooth (e.g., smooth). In other embodiments, the base top surface 62, base right side face 63, base left side face 64, base front side face 65, base rear side face 66, and base bottom surface 67 are at least partially textured (e.g., textured). In still other embodiments, each particular surface and face of the base portion 20 may have any suitable texture and/or smoothness.

In the embodiment shown in FIG. 3, the base portion 60 defines a plurality of base magnet recesses 73a-d adjacent the base portion's base top surface 62. In the present embodiment, each base magnet recess 73 is substantially circular (e.g., circular) and defined adjacent a corner of the base portion 60. For example, the first base magnet recess 73a is defined adjacent an intersection point of the base front side face 65 and base left side face 64. The base portion 60 further comprises a plurality of second magnets 72a-d disposed at least partially within the corresponding base magnet recess 73a-d. In the embodiment shown in this figure, each second magnet 72 is substantially cylindrical (e.g., cylindrical) and has a radius that at least partially corresponds to a radius of the corresponding base magnet recesses 73a-d.

In other embodiments, the base portion 60 defines any other suitable number of suitably shaped base magnet recesses 73. For example, the base portion 60 may define one, two, three, four, five, six, seven, eight, nine, ten, or any other suitable number of base magnet recesses 73. The base portion 60 in some embodiments, comprises at least one substantially rectangular (e.g., rectangular) base magnet recess 73, at least one substantially triangular base magnet recess 73 or any other suitable combination or number of base magnet recesses 72 having any suitable combination of shapes. In particular embodiments, the base portion 60 comprises at least one magnet 72 disposed at least partially within each base magnet recess 73. In such embodiments, each particular magnet 72 is sized and shaped to at least generally correspond to a size and shape of each corresponding base magnet recess 73.

In particular embodiments, the base portion 60 defines a plurality of base magnet recesses 73 that each at least generally correspond to a magnet recess 33 defined on the eyewear support portion's bottom surface 27. For example, each base magnet recess 73 may be sized and positioned to correspond to a size and position of a corresponding magnet recess 33 when the base portion's top surface 62 and the eyewear support portion's bottom surface 27 are at least generally aligned with one another as shown in FIG. 3. In the embodiment shown in this figure, the base portion 60 defines four magnet recesses 73a-d adjacent four respective corners of the substantially rectangular (e.g., rectangular) base portion 60. The four magnet recesses 73a-d at least generally correspond to a position of the four magnet recesses 33a-d defined adjacent four corners of the substantially rectangular (e.g., rectangular) eyewear support portion 20.

In various embodiments, the base portion 60 comprises any suitable material such as, for example, any suitable plastic. In a particular embodiment, the at least a portion of the base portion 60 comprises any suitable ferromagnetic or other suitable magnetic material. In such embodiments, the base portion 60 may not comprise any magnets or define any magnet recesses. The base portion 60 may be produced using any suitable manufacturing or other technique such as, for example, injection molding, blow molding, extrusion molding, 3-D printing, etc. In particular embodiments, the base portion 60 is substantially rigid (e.g., rigid). In particular embodiments, the base portion 60 is at least partially translucent (e.g., translucent). In other embodiments, the base portion 60 is substantially opaque (e.g., opaque). In various embodiments, the base portion 60 is sufficiently transparent to allow a person to view one or more images, logos, or other pieces of text through the base portion 20

Assembled Eyewear Display Assembly

FIGS. 4-6 show the assembled eyewear display assembly 10 according to a particular embodiment. As may be understood from these figures, when the eyewear display assembly 10 is assembled, the marketing material portion 40 is at least partially sandwiched between the eyewear support portion 20 and the base portion 60. The eyewear support portion's bottom surface 27 and the marketing material portion's top surface 42 are substantially co-facing (e.g., co-facing), and the marketing material portion's bottom surface and the base top surface 62 are substantially co-facing (e.g., co-facing). Additionally, when the eyewear display assembly 10 is assembled, the brand identifier 50 is at least partially visible through the at least partially transparent (e.g., transparent) eyewear support portion 20.

As may be understood from these figures, the eyewear support portion's first magnets 33a-d are attracted to the base portion's corresponding second magnets 73a-d and exert substantially equal (e.g., equal) and substantially opposite (e.g., opposite) forces on the marketing material portion 40 disposed between the eyewear support portion 20 and base portion 60. This magnetic force between the eyewear support portion's first magnets 33a-d and the base portion's corresponding second magnets 73a-d maintains the eyewear support portion 20 adjacent the base portion 60 and further maintains the marketing material portion 40 between the eyewear support portion 20 and base portion 60. In particular embodiments, the attractive force between the first magnets 33a-d and second magnets 73a-d cause the base portion 60 and eyewear support portion 20 to exert equal and opposite forces on the marketing material portion 40 which substantially prevents (e.g., prevents) the marketing material portion 40 from sliding out from between the base portion 60 and eyewear support portion 20 (e.g., by at least partially squeezing the marketing material portion 40 between them as a result of the magnetic force).

Referring back to FIG. 1, as may be understood from this figure, the base portion 60 supports the eyewear 5 as the eyewear 5 is disposed within each eyewear support cutout 34a-f. As shown in this figure, the eyewear support cutouts 34a-f are configured to maintain the eyewear 5 within the eyewear support cutouts 34a-f while the eyewear support assembly 10 is moved while the eyewear support assembly 10 is substantially parallel (e.g., parallel) to a support surface (e.g., or the ground) or laying substantially flat (e.g., flat) on the support surface. For example, in a particular use of the eyewear display assembly 10, the eyewear display assembly 10 may be disposed (e.g., horizontally) in a drawer or other display case where the eyewear display assembly 10 may be moved (e.g., a customer may open the drawer to view the eyewear displayed and/or stored within, a salesperson may selectively remove the eyewear display assembly from a drawer or display case, etc.). In such embodiments, the eyewear support cutout's front, rear, left and right interior faces 35, 36, 37, 38 cooperate to maintain the eyewear 5 within the eyewear support cutout 34 by providing lateral support to the eyewear 5 (e.g., to substantially prevent the eyewear from sliding with respect to the base portion 60).

Eyewear Display Assembly—Exemplary Assembly Instructions

In order to assemble the eyewear display assembly 10, a user may first place the base portion 10 substantially flat (e.g., flat) on a substantially flat (e.g., flat), substantially horizontal (e.g., horizontal) support surface with the base bottom surface 67 facing downward toward the support surface. In particular embodiments, the support surface may include any suitable support surface such as, for example, a suitable shelf (e.g., in a suitable display case), a suitable drawer, etc. The user may then align the marketing material portion 40 with the base portion 60 (e.g., with the marketing material portion's top face 42 (and brand identifier 50) facing upwards). When aligning the marketing material portion 40 with the base portion 60, the user may place the marketing material portion 40 on the base portion 60 as shown in FIG. 3. When the marketing material portion 40 is on the base portion 60, the marketing material portion's front edge 45, rear edge 46, right side 43, and left side 44 are adjacent the corresponding base front side face 65, base rear side face 66, base right side face 63, and base left side face 64.

The user may then align the eyewear support portion 20 with the marketing material portion 40 and base portion 60 and place the eyewear support portion 20 on top of the marketing material portion 40 and base portion 60 such that the eyewear support portion's bottom surface 27 is facing downwards toward the marketing material portion 40, and the marketing material portion 40 is positioned between the eyewear support portion 20 and base portion 60. The user should ensure that the eyewear support portion's first magnets 32a-d are aligned with and adjacent their corresponding base portion second magnets 72a-d. The user may then place any number of pairs of eyewear within any of the particular eyewear support cutouts 34a-f.

If the user desires to change the marketing material portion 60 (e.g., to display a different brand identifier 50), the user may pull apart the eyewear support portion 20 and base portion 60 with sufficient force to overcome the magnetic force between the eyewear support portion's first magnets 32a-d are their corresponding base portion second magnets 72a-d. The user may then replace the marketing material portion 40 with a different marketing material portion 40 and reassemble the eyewear display assembly as described above.

Alternative Embodiments

Various embodiments of an eyewear display assembly may differ at least slightly from those embodiments described herein. Exemplary alternative embodiments are described below.

Non-Magnetic Affixing Means

In particular embodiments, the eyewear display assembly may include any other suitable means for maintaining the base portion adjacent the eyewear support portion with the marketing material portion between the two. In a particular embodiment, the affixing means may include any suitable fastener such as, for example, internal reinforcements such as dowels or biscuits, rope, string, wire, cable, chain, plastic wrap, one or more latches, one or more clamps, one or more hook and loop fasteners, one or more buttons or snaps, etc. In various embodiments, a suitable fastener may include at least one magnet and at least one piece of magnetic material (e.g., a magnetic fastener). In other embodiments, the affixing means may include, for example, crimping, welding, soldering, brazing, taping, gluing, cementing, or the use of other suitable adhesives. In some embodiments, the affixing means may include any suitable affixing means for enabling a user to selectively separate the base portion from the eyewear support portion (e.g., by detaching the at least one fastener).

Ferromagnetic Materials

In particular embodiments at least a portion of the base portion, at least a portion of the eyewear support portion, and/or at least a portion of both the eyewear support portion and the base portion may comprise any suitable ferromagnetic or other suitable magnetic material (e.g., iron, nickel, cobalt, lodestone, etc.). In particular embodiments: (1) the base portion comprises at least one magnet; (2) at least a portion of the eyewear support portion comprises a suitable magnetic material; and (3) the at least one magnet and the portion of the eyewear support portion comprising the suitable magnetic material are configured to cooperate to maintain the base portion adjacent the eyewear support portion. In other embodiments: (1) the eyewear support portion comprises at least one magnet; (2) at least a portion of the base portion comprises a suitable magnetic material; and (3) the at least one magnet and the portion of the base portion comprising the suitable magnetic material are configured to cooperate to maintain the base portion adjacent the eyewear support portion.

Permanently Attached Base Portion and Eyewear Support Portion

In particular embodiments, the base portion and eyewear support portion may be substantially permanently attached. In such embodiments, the base portion and eyewear support portion may be substantially permanently affixed in any suitable manner. For example, the base portion and eyewear support portion may be substantially permanently affixed about respective outer portions of the base portion and eyewear support portion. In a particular embodiment, the base portion and eyewear support portion may be substantially permanently affixed to and spaced at least slightly apart from one another. In such embodiments, the eyewear support assembly may be configured to enable a user to at least partially insert a marketing material portion in a slot or other space defined between the base portion and the eyewear support portion.

Integrally Formed Base Portion and Eyewear Support Portion

In various embodiments, the base portion and eyewear support portion may be integrally formed with one another. In such embodiments, the base portion and eyewear support portion may comprise a single piece of material (e.g., a suitable polymer, plastic, etc.). In some embodiments, the eyewear support assembly may not include any fasteners to maintain the base portion adjacent the eyewear support portion (e.g., because the base portion and the eyewear support portion constitute a single piece). In such embodiments, the eyewear support assembly may include a marketing material portion disposed below both the base portion and the eyewear support portion (e.g., rather than between the eyewear support portion and base portion).

CONCLUSION

Many modifications and other embodiments of the invention will come to mind to one skilled in the art having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed and that the modifications and other embodiments are intended to be included within the scope of the appended exemplary concepts. Although specific terms are employed herein, they are used in a generic and descriptive sense only and not for the purposes of limitation. The description of the above exemplary embodiments should teach one of skill in the art that many more alternatives exist.

What is claimed is:

1. An eyewear display assembly comprising:
a base portion defining a substantially planar top surface; at least one fastener; and
an eyewear support portion having a first end, a second end, a first side, and a second side, said eyewear support portion defining:
a substantially planar bottom surface;
a top surface; and
at least one eyewear support cutout in the eyewear support portion top surface, wherein:
the at least one fastener is configured to maintain the base portion adjacent the eyewear support portion while:
the base portion is supporting a pair of eyewear; and
the eyewear support portion is maintaining the pair of eyewear at least partially within the at least one eyewear support cutout; and
the at least one eyewear support cutout has a width that is substantially equal to a width of the pair of eyewear.

2. The eyewear display assembly of claim 1, wherein:
the at least one eyewear support cutout is substantially rectangular; and
the eyewear support portion defines a first eyewear support cutout interior face, a second eyewear support cutout interior face, a third eyewear support cutout interior face, and a fourth eyewear support cutout interior face.

3. The eyewear display assembly of claim 2, wherein the first eyewear support cutout interior face, the second eyewear support cutout interior face, the third eyewear support cutout interior face, and the fourth eyewear support cutout interior face are configured to cooperate to maintain the pair of eyewear at least partially within the at least one eyewear support cutout.

4. The eyewear display assembly of claim 3, wherein:
the at least one eyewear support cutout is a first eyewear support cutout; and
the eyewear support portion further defines a substantially rectangular second eyewear support cutout.

5. The eyewear display assembly of claim 4, wherein a central axis of the first eyewear support cutout is substantially parallel to a central axis of the second eyewear support cutout.

6. The eyewear display assembly of claim 5, wherein the first eyewear support cutout and the second eyewear support cutout are substantially parallel to the eyewear support portion's first end.

7. The eyewear display assembly of claim 6 wherein the base portion top surface and the eyewear support portion bottom surface are adjacent and co-facing when the at least one fastener is maintaining the base portion adjacent the eyewear support portion.

8. The eyewear display assembly of claim 1, wherein:
the at least one fastener comprises at least one magnet and at least one piece of magnetic material; and
the at least one magnet and the at least one piece of magnetic material are positioned and configured to cooperate to maintain the base portion adjacent the eyewear support portion while a piece of marketing material is disposed at least partially between the base portion and the eyewear support portion.

9. The eyewear display assembly of claim 8, wherein:
the eyewear support portion defines at least one eyewear support portion magnet cutout adjacent the eyewear support portion bottom surface;
the at least one magnet is disposed at least partially within the at least one eyewear support portion magnet cutout; and
the base portion comprises the at least one piece of magnetic material.

10. The eyewear display assembly of claim 9, wherein the at least one magnet and the at least one piece of magnetic material are positioned and configured to cooperate to maintain the base portion adjacent the eyewear support portion while a piece of marketing material is disposed at least partially between the base portion and the eyewear support portion.

11. The eyewear display assembly of claim 1, wherein:
the eyewear display assembly further comprises a marketing material portion comprising a sheet of paper;
the at least one fastener is further configured to maintain the base portion adjacent the eyewear support portion while the marketing material portion is at least partially disposed between the base portion and the eyewear support portion; and
the sheet of paper comprises at least one marking selected from the group consisting of:
a brand name; and
a logo.

12. The eyewear display assembly of claim 11, wherein at least a portion of the eyewear support portion is at least partially transparent such that the at least one marking is at least partially visible through the at least a portion of the eyewear support portion that is at least partially transparent when the at least one fastener is maintaining the base portion adjacent the eyewear support portion.

13. The eyewear display assembly of claim 12, wherein the at least one fastener comprises at least one magnet.

14. An eyewear display assembly comprising:
a base portion having a first base end and a second base end and defining:
a base top surface;
a first base magnet cutout adjacent the first base end; and
a second base magnet cutout adjacent the second base end; and
an eyewear support portion having a first support end and a second support end and defining:
a support bottom surface;
a support top surface;

a first support magnet cutout adjacent the first support end; and a second support magnet cutout adjacent the second support end;

a first substantially rectangular eyewear support cutout adjacent the support top surface; and a second substantially rectangular eyewear support cutout adjacent the support top surface, a central axis of the second eyewear support cutout being substantially parallel to a central axis of the first eyewear support cutout;

a first magnet disposed at least partially within the first base magnet cutout;

a second magnet disposed at least partially within the second base magnet cutout;

a third magnet disposed at least partially within the first support magnet cutout; and a fourth magnet disposed at least partially within the second support magnet cutout, wherein:

the first magnet is configured to cooperate with the third magnet to maintain the first base end adjacent the first support end;

the second magnet is configured to cooperate with the fourth magnet to maintain the second base end adjacent the second support end;

the base portion is configured to support at least one pair of eyewear; and the eyewear support portion is configured to maintain:

a first pair of eyewear at least partially within the first eyewear support cutout while the base portion is supporting the first pair of eyewear; and a second pair of eyewear at least partially within the second eyewear support cutout while the base portion is supporting the second pair of eyewear.

15. The eyewear display assembly of claim 14, wherein the first eyewear support cutout and the second eyewear support cutout are substantially parallel to the first support end and the second support end.

16. The eyewear display assembly of claim 14, wherein the first base magnet cutout, the second base magnet cutout, the first support magnet cutout, and the second support magnet cutout have a size and shape that are substantially the same.

17. The eyewear display assembly of claim 14, wherein:

the first magnet and the third magnet and the second magnet and the fourth magnet are configured to cooperate to maintain a marketing material sheet at least partially between the base portion and the eyewear support portion; and the first magnet, second magnet, third magnet and fourth magnet are configured to cause the base portion and the eyewear support portion to exert equal and opposing forces on the marketing material sheet when the marketing material sheet is disposed at least partially between the base portion and the eyewear support portion.

18. The eyewear display assembly of claim 17, wherein the marketing material sheet comprises at least one marking selected from the group consisting of:

a brand name; and a logo.

19. The eyewear display assembly of claim 18, wherein at least a portion of the eyewear support portion is at least partially transparent such that the at least one marking is at least partially visible through the at least a portion of the eyewear support portion that is at least partially transparent when the marketing material sheet is disposed at least partially between the base portion and the eyewear support portion.

20. A method of displaying eyewear comprising:

providing an eyewear display assembly comprising:

a base portion defining a base top surface and comprising at least one base magnet; and an eyewear support portion:

defining a support bottom surface, a support top surface, and at least one eyewear support cutout adjacent the support top surface; and comprising at least one support magnet;

facilitating placement of the base portion on a support surface with the base top surface facing substantially upwards;

facilitating placement of a marketing material sheet on top of the base portion such that the marketing material sheet is substantially aligned with the base top surface;

facilitating placement of the eyewear support portion on top of the marketing material sheet and the base portion such that:

the support bottom surface is facing substantially downwards;

the support bottom surface and the base top surface are substantially co-facing; and the at least one base magnet and the at least one support magnet are cooperating to maintain the base portion adjacent the eyewear support portion with the marketing material sheet at least partially between the base portion and the eyewear support portion; and facilitating placement of a pair of eyewear at least partially within the at least one eyewear support cutout.

21. The method of claim 20, wherein at least a portion of the eyewear support portion is at least partially transparent so that at least a portion of the marketing material sheet can be read through the at least a portion of the eyewear support portion that is at least partially transparent when the eyewear support portion is being held in place relative to the base portion by the at least one base magnet and the at least one support magnet.

* * * * *